June 16, 1925.

A. F. KELLY

VEHICLE WHEEL

Filed Feb. 12, 1923

1,542,058

Inventor
ADELBERT F. KELLY
By Paul, Paul Moore
ATTORNEYS

Patented June 16, 1925.

1,542,058

UNITED STATES PATENT OFFICE.

ADELBERT F. KELLY, OF SPOKANE, WASHINGTON.

VEHICLE WHEEL.

Application filed February 12, 1923. Serial No. 618,550.

*To all whom it may concern:*

Be it known that I, ADELBERT F. KELLY, citizen of the United States, resident of Spokane, in the county of Spokane and State of Washington, have invented certain new and useful Improvements in Vehicle Wheels, of which the following is a specification.

This invention relates to new and useful improvements in vehicle wheels and more specifically to such wheels employing resilient or spring spokes.

Generally considered, the invention consists in the employment of novel resilient members connecting the spring spokes at points intermediate the hub and rim. These resilient members may be employed in conjunction with single spokes or with the usual bowed pairs of spring spokes, the latter form being shown in the drawings. This novel resilient means is adapted to reinforce the spokes and to aid in absorbing the spokes and damping the spoke vibration under working conditions.

The object of the invention is to provide an improved vehicle wheel.

Other objects of the invention will more fully appear from the following description and the accompanying drawings and will be pointed out in the annexed claims.

In the accompanying drawings there has been disclosed a structure designed to carry out the objects of the invention but it is to be understood that the invention is not confined to the exact features shown, as various changes may be made within the scope of the claims which follow.

Figure 1:
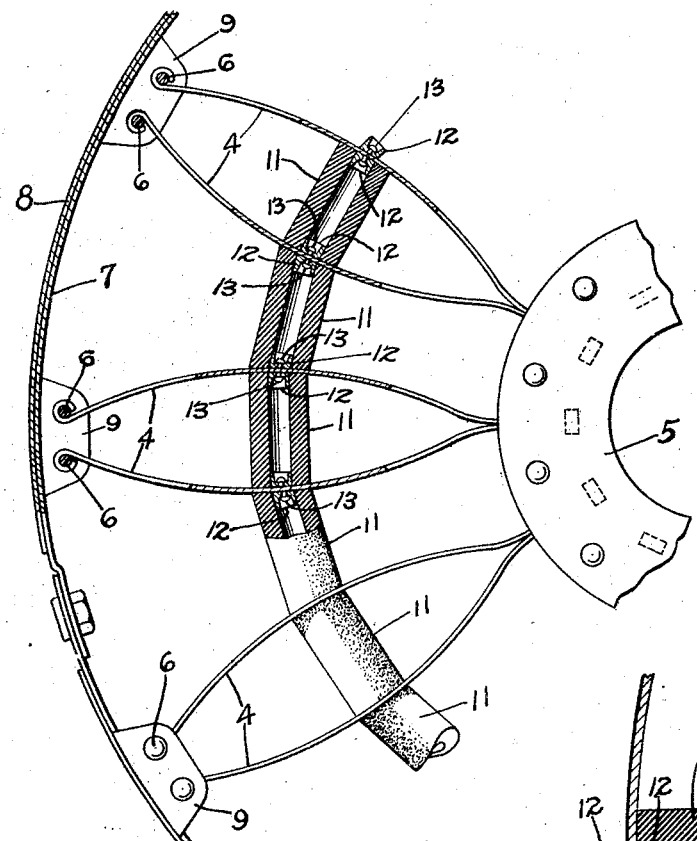
Figure 1 is a view in side elevation, partly broken away, of a wheel embodying the invention.

While this novel invention may be employed in conjunction with spring spokes of the single or double type, it is here shown, for purposes of explanation, in conjunction with bowed spring spokes of the type set forth in applicant's Patents No. 1,328,244 of January 13, 1920; No. 1,456,275 of May 22, 1923; and No. 1,461,912 of July 17, 1923. As no invention is herein claimed in regard to the hub, rim or spoke connections between the hub and rim, such parts are more or less generally shown and need not be described in detail.

The spring spokes here shown consist of metallic bowed spring leaves 4 arranged in complementary pairs converging toward the hub 5 and having substantially parallel portions extending within the hub wherein they are held. The outer end of each spoke 4 is shown as mounted upon a rivet 6 carried by the rim.

The rim construction, which constitutes the subject-matter of and is claimed in this inventor's prior Patent No. 1,412,352 of April 11, 1922, need only be briefly described. The rim consists of a spoke-attaching section 7 and a reinforcing section 8 rigidly secured to each other in any suitable manner as, for example, by rivets. Portions of the inner section 7 are bent inwardly upon opposite sides thereof to form oppositely disposed pairs of members 9 through which the rivets 6 extend whereby the outer ends of the spokes are held.

While a vehicle wheel so constructed to have its rim and hub connected by spring spokes, whether single members or disposed complementary bowed pairs, will have a relatively large amount of inherent resilience and shock-absorbing qualities, this improved wheel also provides resilient means interposed between the spokes intermediate the hub and rim. Such resilient means may be so positioned between adjacent spokes or between the bowed spoke-members of each pair, or it may be employed both between the bowed members as well as between adjacent spokes, the later form being shown in the drawings. The preferred form of resilient means consists of elongated rubber sections 11. The rubber sections here shown are hollow or tubular which lightens the weight of the section without unduly weakening the section. While each end of each section 11 may be vulcanized to a spoke face, it is preferred to provide additional means for securing the sections to the spokes.

Figure 2:
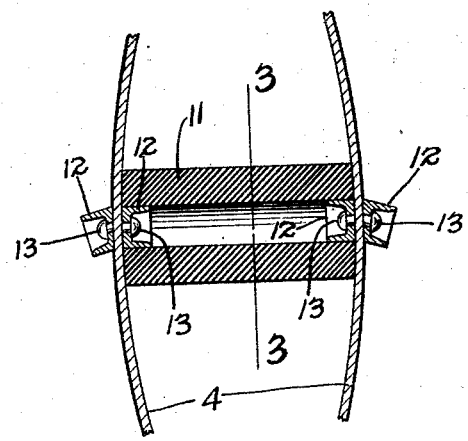
Figure 2 is an enlarged vertical sectional view through one of the spoke pairs and novel resilient member.
Figure 3:
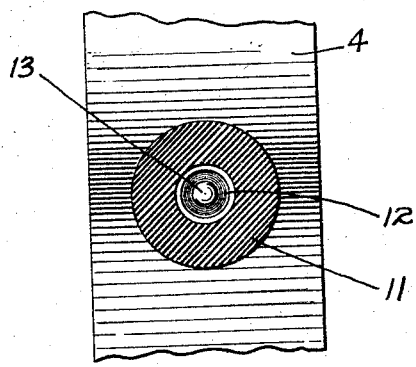
Figure 3 is a sectional view on the line 3—3 of Figure 2.

Such means for securing the sections to the spokes consists of elements secured to the spokes in oppositely projecting pairs. Each projecting element is adapted to be received within one of the hollow ends of a section 11. The preferred form of such spoke elements is here shown as a thimble or cup-shaped stud 12 as is shown in the enlarged detailed view of Figure 2. The base of each cup-shaped stud is apertured in order that welding metal may be placed within the cup of the stud and pass through the aperture to the face of the spoke upon which the stud is positioned and thus form a rivet 13. The stud is also electrically welded to hold it in position upon the spoke. The exterior surface of each stud is shaped to correspond to the interior opening of the hollow sections. Both are here shown as round.

Spring spokes of vehicle wheels tend to become yieldably distorted during their absorption of cushioning of shocks that are imparted to the wheels under working conditions. This distortion probably reaches its maximum at points intermediate the hub and rib. These novel resilient sections are therefore secured to the spokes intermediate the hub and rim and function to absorb the shocks and vibrations of the spring spokes and to increase the structural strength of the spokes. Not only are the spokes strengthened but lighter steel may be employed without reduction of wheel strength and cushioning qualities.

Having thus described my invention what I claim as new and desire to secure by Letters-Patent, is:

1. In a vehicle wheel, the combination of a hub, a rim, and pairs of intermediately bowed resilient spokes connecting the hub and rim, with resilient means interposed between the bowed portions of the members of each pair.

2. In a vehicle wheel, the combination of a hub, a rim, and pairs of intermediately bowed resilient spokes connecting the hub and rim, with resilient means interposed between the bowed portions of the members of each pair and between adjacent pairs of spokes intermediate the hub and rim.

3. In a vehicle wheel, the combination of a hub, a rim, and pairs of intermediately bowed resilient spokes connecting the hub and rim, with resilient means interposed between the bowed portions of the members of each pair and between adjacent pairs of spokes intermediate the hub and rim, said resilient means being substantially continuous and concentric with the rim.

4. In a vehicle wheel, the combination of a hub, a rim, and resilient spokes connecting the hub and rim, with elements disposed on said spokes in complementary pairs, and a plurality of resilient members, each one being adapted to extend between adjacent spokes and having hollow terminal portions each to receive one of said elements whereby each member may be secured in operative position.

5. In a vehicle wheel, the combination of a hub, a rim, and resilient spokes connecting the hub and rim, with elements on said spokes projecting toward each other, and a plurality of elongated hollow members each one being adapted to extend between adjacent spokes and terminally to receive said elements whereby each member may be secured in operative position.

6. In a vehicle wheel, the combination of a hub, a rim, with resilient metallic spokes connecting the hub and rim, with metallic studs on said spokes projecting toward each other in cooperable pairs, each stud being recessed and inwardly apertured to receive welding metal whereby each stud may be secured to a spoke, and resilient means carried between the spokes by said cooperable pairs of studs.

In witness whereof, I have hereunto set my hand this 6th day of February, 1923.

ADELBERT F. KELLY.